United States Patent [19]
Morgan

[11] 3,893,686
[45] July 8, 1975

[54] COLLAPSIBLE CART

[75] Inventor: Lawrence M. Morgan, Anoka, Minn.

[73] Assignee: The Cornelius Company, St. Louis Park, Minn.

[22] Filed: Mar. 18, 1974

[21] Appl. No.: 451,929

[52] U.S. Cl. ............................ 280/36 R; 280/79.2
[51] Int. Cl. ............................................. B62b 3/00
[58] Field of Search....... 280/36 R, 79.1, 79.2, 79.3; 220/6

[56] References Cited
UNITED STATES PATENTS
| | | | |
|---|---|---|---|
| 3,191,959 | 6/1965 | Heimbruch | 280/36 R |
| 3,464,715 | 9/1969 | Anderson | 280/36 R |

*Primary Examiner*—Robert R. Song
*Attorney, Agent, or Firm*—Hill, Gross, Simpson, Van Santen, Steadman, Chiara & Simpson

[57] ABSTRACT

A collapsible merchandise cart includes a bottom frame, to the rear of which there is pivoted a rear frame which can be locked in an upright position by means of a pair of side frames pivoted to the forward lateral edges of the rear frame, and locked in normal position by retainer assemblies carried by the bottom frame. All of said frames can be collapsed to a position where they are substantially parallel to each other, and the collapsed cart can be stored on edge with all the frames upright, and dollied in that general position from either side.

12 Claims, 6 Drawing Figures

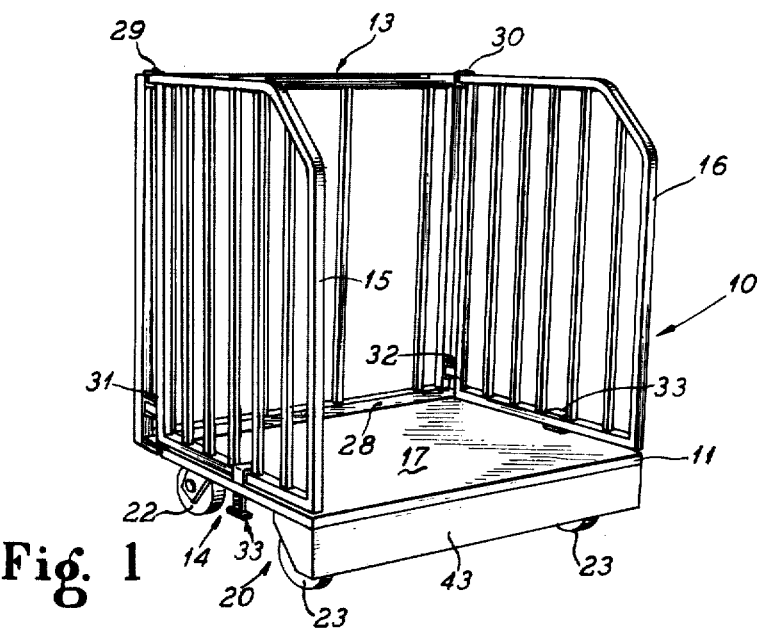
Fig. 1
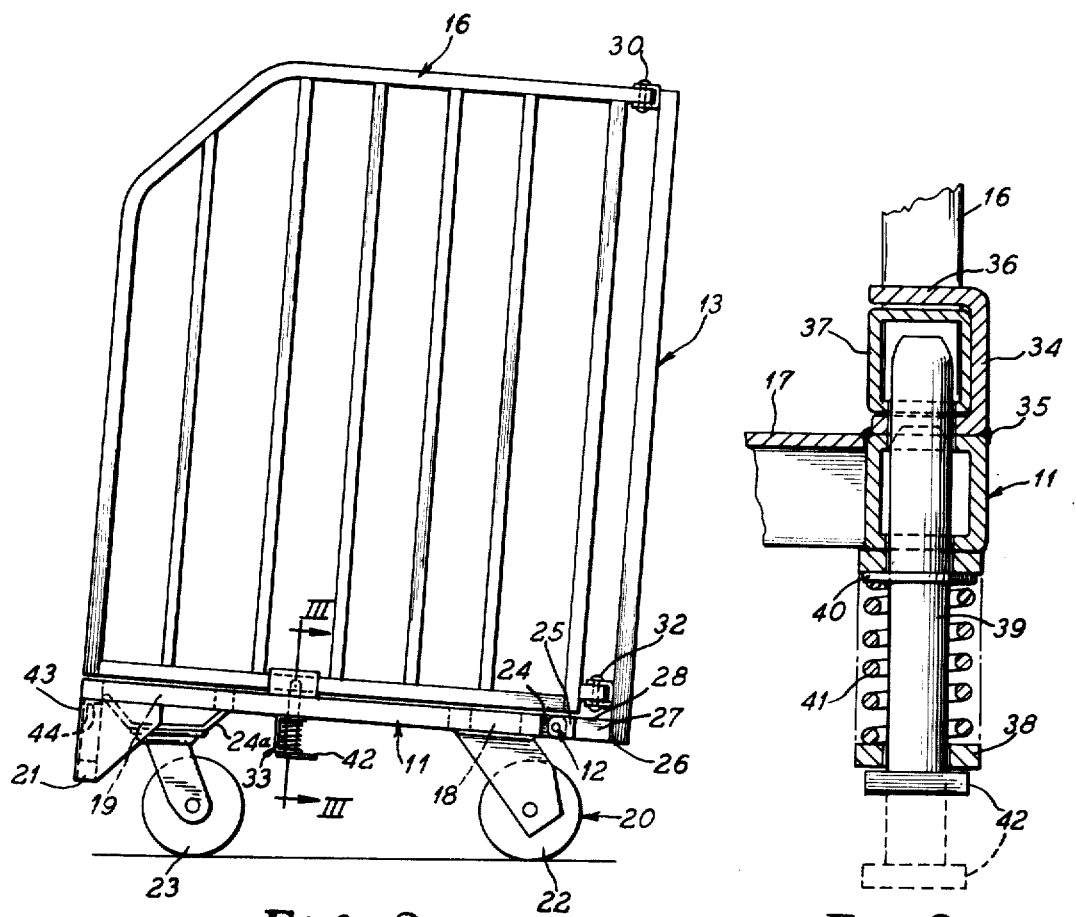
Fig. 2
Fig. 3

COLLAPSIBLE CART

BACKGROUND OF THE INVENTION

This invention pertains to a collapsible merchandise-display cart.

1. Prior Art

One of the better prior art devices of this general type is shown in FIGS. 5 and 6 of U.S. Pat. No. 3,191,959. However, that device has two disadvantages in that it lacks stability when collapsed and stored on edge, and further when collapsed, it is difficult to move about, for instance if the side with wheels on it were disposed against a wall or another collapsed cart.

2. Summary of the Invention

The present invention is directed to a collapsible cart which can be stored on edge in a stable manner and which can be moved about in the manner of a dolly, and such movement can be achieved with the operator grasping the collapsed cart from either side.

Accordingly, it is an object of the present invention to provide an improved collapsible merchandise cart.

A further object of the present invention is to provide a collapsible merchandise cart which, when collapsed and stored on edge, is stable.

A further object of the present invention is to provide a collapsible merchandise cart that can be directly grasped from either side and moved about in the manner of a dolly.

Yet another object of the present invention is to provide a collapsible merchandise cart having lock means, the access to which is concealed in use.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

ON THE DRAWINGS:

FIG. 1 is a perspective view of a collapsible merchandise cart provided in accordance with the principles of the present invention;

FIG. 2 is an enlarged elevational view of the right side thereof;

FIG. 3 is a fragmentary enlarged cross sectional view taken along line III-III of FIG. 2;

Figure 4:
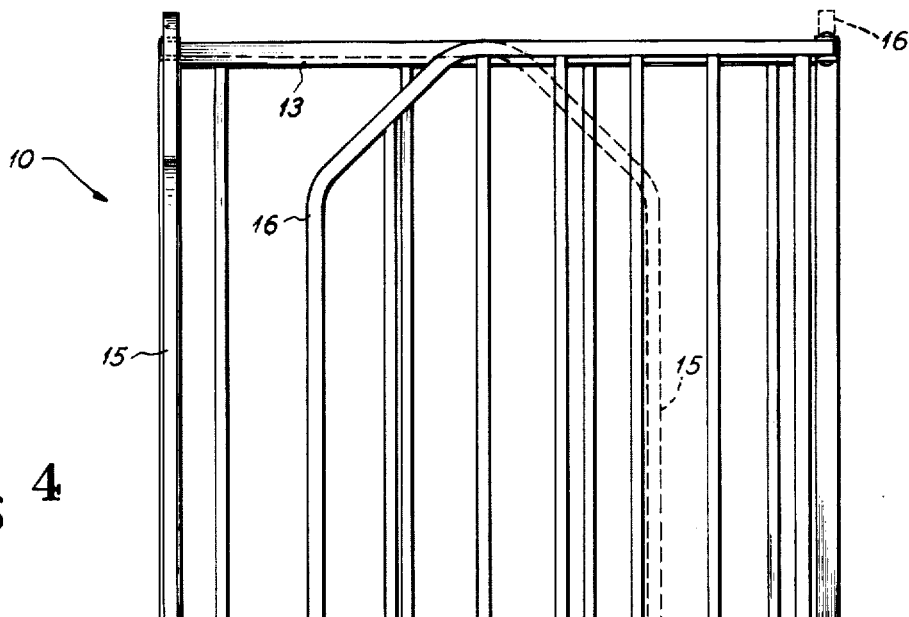
FIG. 4 is a front elevational view, certain broken lines illustrating pivoting of the side frames.

AS SHOWN ON THE DRAWINGS:

The principles of the present invention are particularly useful when embodied in a collapsible merchandise cart of the display type such as illustrated in FIG. 1, generally indicated by the numeral 10. The cart 10 includes a bottom frame 11, connected by a transverse hinge 12 (FIG. 2) to a rear frame 13 which is locked in the position illustrated in FIGS. 1 and 2 by lock means generally indicated at 14 which includes a pair of normally vertical side frames 15, 16.

The bottom frame 11 includes a generally horizontal platform 17 and, as best seen in FIG. 2, the platform has a rearward transverse structural member 18 and a forward transverse structural member 19 to which support means generally indicated at 20 are secured. A handle 21 is secured to the forward edge of the bottom frame 11 and has a skirt 43 or flange-like appearance so that it can also provide the additional function of serving as a convering screen to substantially hide the support means 20.

Figure 6:
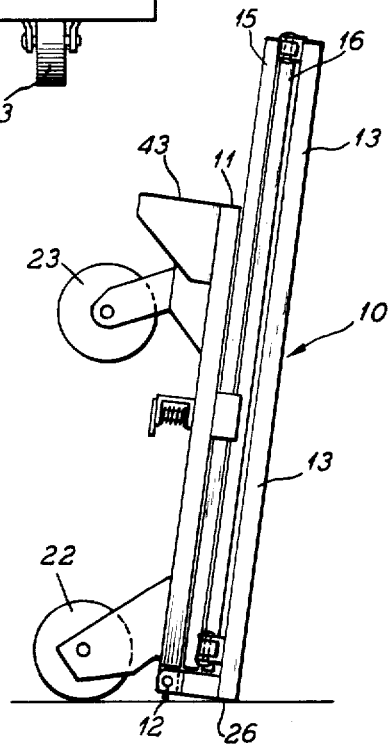
FIG. 6 is a side elevational view showing the cart in upright storage position.

The support means 20 are disposed entirely below the bottom frame 11 and below the hinge 12 and all the support means 20 are fastened or secured to the bottom frame 11. One portion of the support means 20 comprises a pair of wheels 22 which are mounted for rotation about a fixed axis parallel to the axis of the hinge 12. The other portion of the support means 20 comprises a pair of castered wheels 23, 23. The wheels 22 are secured to the rearward transverse structural member 18 and the wheels 23 are secured to the forward transverse structural member 19. Preferably, a riser 24a is used between the castered wheels and the bottom frame 11 so as to provide a slight tilt toward the rear from a true horizontal whereby goods supported on the bottom frame 11 tend to lean toward the rear frame 13. The portion of the support means 20 that comprises the wheels 22 extends at their periphery to the rear of the bottom frame 11, and as best seen in FIG. 6 described later herein, to the rear of the collapsed rear frame 13.

The transverse hinge 12 comprises one portion 24 that is secured to the rear of the bottom frame 11 and an other portion 25 secured to the rear frame 13.

The rear frame 13 is thus pivotably supported by the hinge 12 and is normally in an upright position as illustrated. The rear frame 13 has a lower edge 26 which is offset from the bottom frame 11 by spacer means 27, the spacer means 27 extending at a right angle to the rear frame 13 and being rigidly secured thereto. Thus the rear frame 13 has a rearward offset from the axis of the hinge 12. On the spacer means 27 there is disposed a horizontal filler platform 28 for supporting any merchandise that overhangs the rear edge of the platform 17.

The rear frame 13 is held in the upright position by the lock means 14 which acts between the rear frame 13 and the bottom frame 11, locking the rear frame 13 in the upright position. To that end, the lock means 14 includes the normally vertical side frames 15, a set of four hinges 29-32, and a retainer assembly 33.

Figure 5:
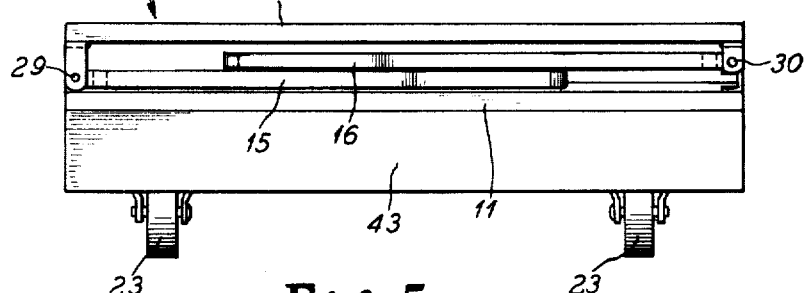
FIG. 5 is a further front elevational view illustrating full collapse thereof.

The side frames 15, 16 are disposed at the front of the rear frame 13 and each has a front-to-rear dimension which is less than the width of the rear frame 13. The side frames 15, 16 are connected to the rear frame 13 by means of the hinges 29-32. The hinges 30, 32 have an axis which is offset in a forward direction from the rear frame 13 by an amount enabling the side frame 16 to be pivoted to a position where it is parallel to the rear frame 13. The other hinges 29, 31 are offset by a greater amount as best seen in FIG. 5, the offset being approximately double that of the hinges 30, 32. The greater offset enables the side frame 15 to be pivoted to a position where it is parallel to the rear frame 13 in overlapping relation to the side frame 16 as seen in FIG. 5. Thus both side frames 15, 16 can be pivoted to be parallel to and adjacent to the rear frame 13. Once the side frames 15, 16 are pivoted to be parallel with the upright rear frame 13, then the frames 13, 15 and 16 can be pivoted as a unit by virtue of the hinge 12 to be adjacent to and parallel to the bottom frame 11 as shown in FIG. 5. The amount of such pivoting is limited by a stop portion of the hinges 29, 31. The stop portion of these hinges that does the limiting is that portion which is secured to the rear frame 13 and thus forms a part of the hinges 29, 31 that have the greatest offset in a forward direction as best seen in FIG. 5, the hinges 29-32 being at all times above the support means 20. The offset enables both of the side frames 15, 16 to be parallel to and adjacent to the rear frame 13, and to space the frames 15, 16 and 13 in parallel adjacent relationship to the bottom frame 11.

One of the retainer assemblies 33 is disposed at each lateral side of the bottom frame 11. As best seen in FIG. 3, a rigid clip 34 is secured as by a weld 35 to the bottom frame 11 and has a C-shaped vertical cross section, the upper arm 36 of which overhangs the bottom frame 11 so that the clip 34 also is laterally receptive of a lower apertured portion 37 of the side frame 16.

A further C-shaped clip 38 is secured to the lower side of the bottom frame 11 as best seen in FIGS. 2 and 3, there being a series of apertures in the lower arm, the upper arm, the bottom frame 11, the rigid clip 34 and the portion 37 of the side frame 16. A lock pin 39 has an intermediate flange 40 which is urged by a spring 41 acting between the lower arm of the C-shaped clip 38 and the flange 40 to urge the lock pin 39 in an upward direction to the position illustrated. The lock pin 39 projects downwardly through the lower arm of the C-shaped clip 38 and terminates in a head 42 which is elongated as shown in FIG. 2 to enable lowering thereof by pressing with the finger or toes of the operator so as to retract the upper end of the lock pin 39 from the position shown in solid lines to that shown in broken lines in FIG. 3. When the lock pin 39 is in a downward or retracted position, the side frame 16 is free to pivot about its hinges 30, 32 from the position shown in solid lines in FIG. 1 to the position shown in solid lines in FIG. 4.

In like manner, a similar retainer assembly 33 is provided for the side frame 15 to enable it to pivot from the position shown in solid lines in FIGS. 1 and 4 to that shown in broken lines in FIG. 4.

The cart 10 normally is in its open or non-collapsed condition as illustrated in FIG. 1. Articles may be stored or stacked thereon remotely from areas open to customers, and the loaded cart can be wheeled to fit into a display rack in side-by-side relation with other similar racks. This arrangement enables the shielding of accessability of the retainer assemblies 33 from both a visual standpoint and from a tampering standpoint. The handle 21 is provided with a skirt 43 which has generally triangular ends that are turned around the end of the handle 21 as shown in FIG. 1. The skirt 43 thus provides further mechanical and visual shielding for the retainer assemblies 33 and the support means 20. The skirt 43 is held by a strip of angle iron secured to the bottom frame 11.

When the cart 10 is not in use it can be collapsed for storage. First, the right-hand retainer assembly 33 is actuated so as to release the side frame 16 which is pivoted about the hinges 30, 32 from the position shown in FIG. 1 to that shown in FIG. 4. Then the left-hand retainer assembly 33 is released so as to enable pivoting of the left side frame 15 from the position shown in solid lines in FIGS. 1 and 4 to that shown in a broken line in FIG. 4. The three upright frames 13, 15, 16 can now be pivoted as a unit about the axis of the transverse hinge 12 toward the front of the cart 10 to the position shown in FIG. 5 wherein all the frames 11, 13, 15, 16 are substantially horizontal and are substantially parallel to each other. Up to this point in the collapse of the cart, the floor space occupied has not been reduced. However, when it is collapsed as shown in FIG. 5, the cart 10 can be grasped between the wheels 23 by the handle 21 lying in back of the skirt 43 and pivoted from a horizontal position about the axis of the rear wheels 22 until the rear edge 26 engages the supporting floor indicated by a horizontal line diagrammatically. The amount of pivoting is in excess of 90 degrees and is less than 100 degrees. Thus, the portion of the support means that comprises the pair of wheels 22 along with the edge 26 of the rear frame 13 jointly comprise means for supporting the cart in an upstanding position in which all of the frames 11, 13, 15 and 16 are upright. The arrangement as shown in FIG. 6 is particularly stable because the support means 22, 23 lie to the left of the center of gravity while the now-upper end of the frames 11, 13, 15 and 16 are to the right of the center of gravity.

In addition, the front support means 23 and the bottom frame 11 lie to the right of the contact point of said rear support means 22 against a floor surface and to the left of the contact of the lower edge 26 of the rear frame 13 against the floor surface. The bottom frame 11 and the front support means 23 tend to turn clockwise (about the axis of the support means 22) when the cart is upright as shown in FIG. 6, and thus a downward force is applied at the axis of the hinge 12, which force in turn biases the rear frame 13 and the side frames in a counterclockwise direction about the lower edge 26 of the rear frame 13, and thus urges those frames against the bottom frame 11. Thus the upright collapsed cart has its frames held positively against each other and is stabile in such position.

A user can approach the upstanding collapsed cart 10 from the left as shown in FIG. 6 and grasp the handle and tilt the cart 10 by a small amount, or the user can approach the cart 10 from the right side and grasp the rear frame 13 and tilt it by a slight amount in the same direction and thus conveniently move the collapsed cart on the rear wheels 22 while in the collapsed condition.

The amount of offset that the spacer means 27 provides is dependent upon the thickness of the side frames 15, 16 and such spacing is at least the combined thickness of such side frames 15, 16, thereby enabling the rear frame 13 and the side frames 15, 16 all to be parallel to the bottom frame 11.

Further, with this arrangement, access to the retainer assemblies 33 is concealed and blocked, and the device can be readily rolled about on its own wheels in either the fully open or the collapsed condition, and the deivce can be stored on edge when collapsed without instability ensuing.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A collapsible merchandise cart, comprising:

a. a bottom frame having a normally generally horizontal platform for support of goods thereon, and a rear edge;
b. a transverse hinge having a front portion secured to the rear of said bottom frame;
c. front and rear support means disposed below said bottom frame and below said hinge and all secured to said bottom frame, said rear support means normally extending horizontally beyond said rear edge of said bottom frame;
d. a rear frame secured to a rear portion of said hinge and having a lower edge, said rear frame being pivotable between a normally upright position generally perpendicular to said bottom frame, and a collapsed position generally horizontal and parallel to said bottom frame;
e. means operable between said frames to lock said rear frame in said upright position; and
f. said rear support means and said lower edge of said rear frame jointly forming means for supporting the cart, when collapsed, in an upstanding position in which both said frames are upright.

2. A cart according to claim 1 including handle means secured to said bottom frame and disposed at the front thereof.

3. A cart according to claim 1 including a horizontal filler disposed on said rear portion of said hinge for support of any goods which overhang said rear edge of said bottom frame.

4. A cart according to claim 1 in which said rear support means extends horizontally to the rear of the collapsed position of said bottom and rear frames so that the collapsed cart must be pivoted on said rear support means by an angle exceeding 90 degrees before said lower edge provides part of the support for the upright collapsed cart.

5. A cart according to claim 4 in which said angle is less than 100 degrees.

6. A cart according to claim 1 in which said lock means comprises:
a. a pair of normally vertical side frames disposed at the front of said rear frame and respectively connected by hinges to opposite side portions of said rear frame for pivoting about normally vertical axes to a collapsed position between said rear frame and said bottom frame; and
b. a pair of retainer assemblies respectively secured to opposite lateral sides of said bottom frame and lockingly receptive of said side frames.

7. A cart according to claim 6 in which said rear frame is rearwardly offset from the axis of said transverse hinge by an amount at least as great as the combined thickness of said side frames to enable said side frames and said rear frame to be jointly pivoted to positions parallel to said bottom frame.

8. A cart according to claim 7 in which at least one vertical axis hinge has a stop portion carried by said rear frame, said stop portion being engageable with said bottom frame when the cart is collapsed to maintain the pivoted rear frame substantially parallel to said bottom frame.

9. A cart according to claim 6 in which all said vertical axis hinges are spaced upwardly from said support means.

10. A cart according to claim 1 in which said lock means comprises:
a. a pair of normally vertical side frames disposed at the front of said rear frame and respectively connected by hinges to opposite side portions of said rear frame for pivoting about normally vertical axes;
b. a pair of rigid clips secured to opposite lateral sides of said bottom frame and having a cross-section overhanging and laterally receptive of an apertured portion of the associated side frame to preclude pivoting of said rear frame; and
c. a pair of lock pins slidably mounted in said bottom frame at its lower side and respectively movable into and out of the apertures in said side frames to preclude said pivoting of said side frames.

11. A cart according to claim 10 in which said apertured portion of the side frame comprises structure apertured only at its lower side by which the upper end of said lock pin is concealed.

12. A cart according to claim 10 in which at least one of said rigid clips has an apertured C-shape cross section, one of said lock pins being receivable in the aperture of said clip.

* * * * *

UNITED STATES PATENT OFFICE
CERTIFICATE OF CORRECTION

PATENT NO. : 3,893,636
DATED : July 8, 1975
INVENTOR(S) : Walter R. Wise & Nicholas L.A. Martucci It is certified that error appears in the above-identified patent and that said Letters Patent are hereby corrected as shown below:

Claim 24, line 3, after air delete "tape feed" and insert therefor --impulse--.

Claim 25, line 4, after tape insert --feed--.

Claim 25, line 5, delete "tape feed".

Claim 35, line 5, delete "sand" and substitute therefor --and--.

Signed and Sealed this fourteenth Day of October 1975

[SEAL]

Attest:

RUTH C. MASON
Attesting Officer

C. MARSHALL DANN
Commissioner of Patents and Trademarks